United States Patent [19]

Young

[11] 3,954,307

[45] May 4, 1976

[54] LOAD SENSING PROPORTIONING VALVE INCLUDING INERTIA RESPONSIVE ELEMENT

[75] Inventor: Michael R. Young, Farmington, Mich.

[73] Assignee: Kelsey-Hayes Corporation, Detroit, Mich.

[22] Filed: Jan. 21, 1974

[21] Appl. No.: 434,954

[52] U.S. Cl. .............................. 303/24 F; 188/195; 188/349; 303/6 C; 303/22 R

[51] Int. Cl.$^{2}$ ........................................... B60T 8/16

[58] Field of Search ........................ 303/24, 6 C, 22; 188/195, 349

[56] References Cited

UNITED STATES PATENTS

| | | | |
|---|---|---|---|
| 3,143,379 | 8/1964 | Eksergian | 303/24 F |
| 3,276,822 | 10/1966 | Lister et al. | 303/24 F |
| 3,463,556 | 8/1969 | Kersting | 303/6 C |
| 3,582,153 | 6/1971 | Pitcher | 303/24 C |
| 3,825,303 | 7/1974 | Yabuta | 303/24 C X |
| 3,881,786 | 5/1975 | Stelzer et al. | 303/6 C X |

*Primary Examiner*—Trygve M. Blix
*Assistant Examiner*—Douglas C. Butler

[57] ABSTRACT

A load sensitive proportioning valve for an automotive vehicle having a source of hydraulic fluid and front and rear hydraulically actuated brake systems, the proportioning valve being operable to modulate the brake pressure in one of the brake systems to provide for a reduced brake effect at the rear wheels relative to that at the front wheels to compensate for the weight transfer during braking, the valve including a modulating piston movable between positions opening and closing a flow path from the fluid source and the one brake system a first bias producing element for providing a force to move the piston element as a function of the magnitude of the deceleration of the vehicle, and a second bias producing element providing a force to move the piston in response to the fluid pressure of the one system and the modulated fluid pressure of the proportioning valve, whereby the modulating effect of the proportioning valve compensates for variations in loading of the vehicle.

54 Claims, 5 Drawing Figures

FRONT WHEELS
REAR WHEELS
Front of Vehicle

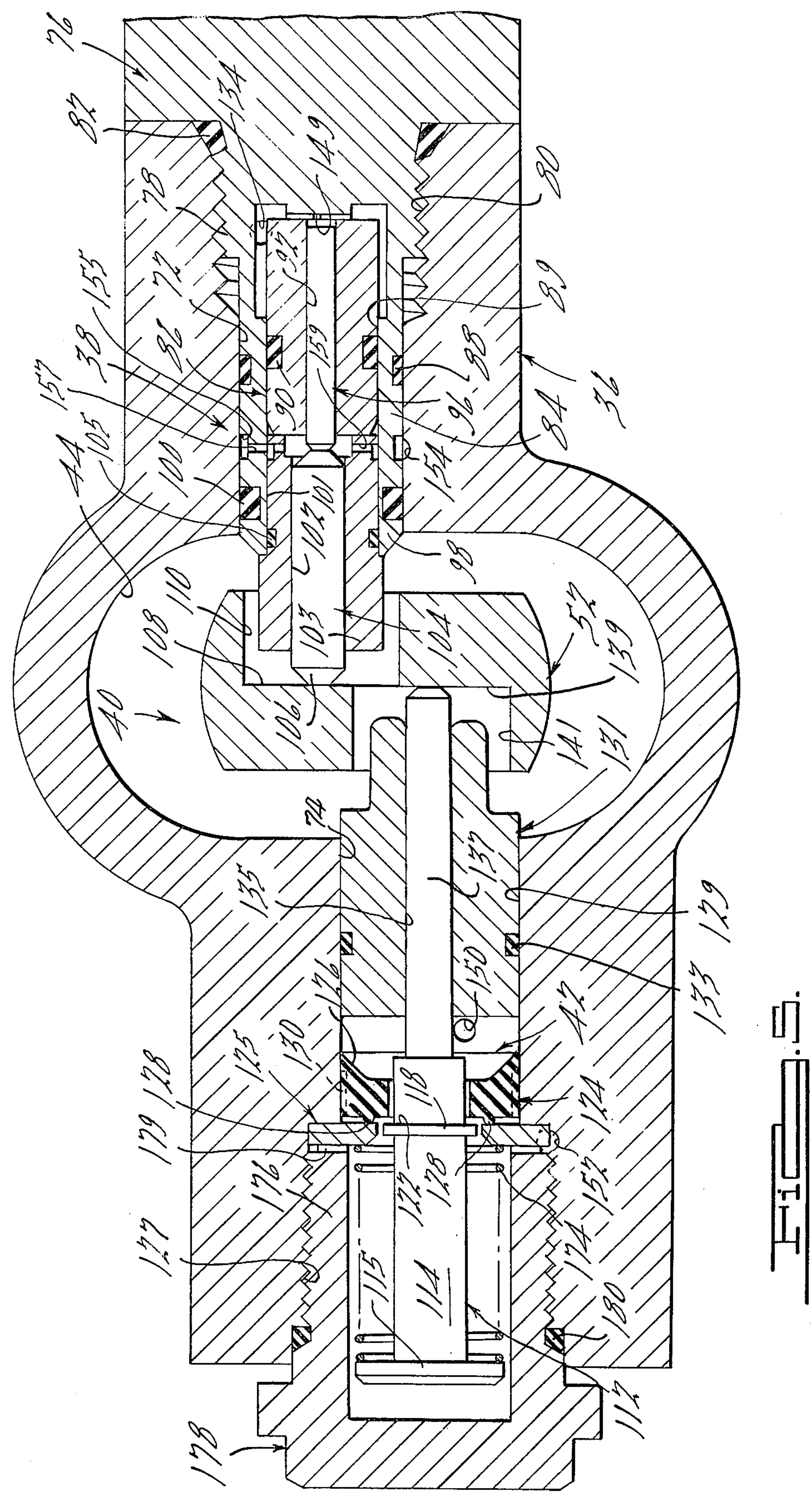

LOAD SENSING PROPORTIONING VALVE INCLUDING INERTIA RESPONSIVE ELEMENT

BACKGROUND OF THE INVENTION

1. Field of the Invention

Proportioning devices for vehicle hydraulic brake systems.

2. Description of the Prior Art

In conventional proportioning valves for hydraulic vehicular brake systems, the effect of weight transferred from the rear wheels to the front wheels during a braking operation is compensated such that upon attainment of a selected level of output pressure from the master cylinder of the associated brake system, further pressure increases to the rear brakes occur at a preselected ratio, resulting in the brake pressure supplied to the rear brake system being predeterminately less than the master cylinder pressure, whereby to deter premature lock-up of the rear wheels as the weight of the vehicle is transferred from the rear wheels to the front wheels thereof.

Although proportioning valves heretofore known and used have been capable of closely approximating the idealized relationship between the pressure to the front brakes (often the master cylinder) and the pressure to the rear brakes, under varying load conditions, substantial deviations occur between the idealized relationship and the actual performance of the proportioning valves. The problem of modifying the operation of the proportioning valves in accordance with the vehicle loading has been approached in a number of different ways, such as through the use of connecting linkages between the proportioning valves and the associated vehicle suspensions. Additionally, the use of so-called "blend-back" valves have been used to improve the operation of conventional proportioning valves, one of which is shown in U.S. patent application Ser. No. 393,132, filed Aug. 30, 1973; however, it has been found that blend-back type valves work satisfactorily only if there exists a significant increase in the front brake pressure when moving from an unloaded to a loaded vehicle weight, and therefore in many applications, such blend-back type valves are not entirely satisfactory.

The invention disclosed in U.S. patent application Ser. No. 124,214, filed Mar. 15, 1971 now abandoned, overcomes a number of objectionable characteristics of the linkage-type load sensitive proportioning valves and is fully applicable in a number of areas wherein blend-back valves cannot be used, and the present invention is generally related to the valve assembly shown in the aforementioned application.

SUMMARY OF THE INVENTION

This invention relates generally to vehicular braking systems and, more particularly, to a new and improved load sensitive proportioning valve for controlling the pressure of the brake fluid supplied to the rear brake system of a vehicle in accordance with variations in vehicle loading.

It is accordingly a general object of the present invention to provide a new and improved vehicle braking system of the above-described character.

It is a more particular object of the present invention to provide a new and improved load sensitive proportioning valve which obviates the need for any linkages or other connections to the associated vehicle suspension system.

It is a further object of the present invention to provide a new and improved load sensitive proportioning valve which is adapted to function in a manner similar to the proportioning valve shown in the aforementioned patent application, Ser. No. 124,214, but which is of a relatively simpler design and is therefore more economical to manufacture and easy to assemble.

Other objects and advantages of the present invention will become apparent from the following detailed description taken in conjunction with the accompanying drawings.

BRIEF DESCRIPTION OF THE DRAWINGS

FIG. 5 is an enlarged transverse cross-sectional view of another portion of the proportioning valve structure shown in FIG. 2.

DESCRIPTION OF A PREFERRED EMBODIMENT

Figures 1, 2, 3, 4:
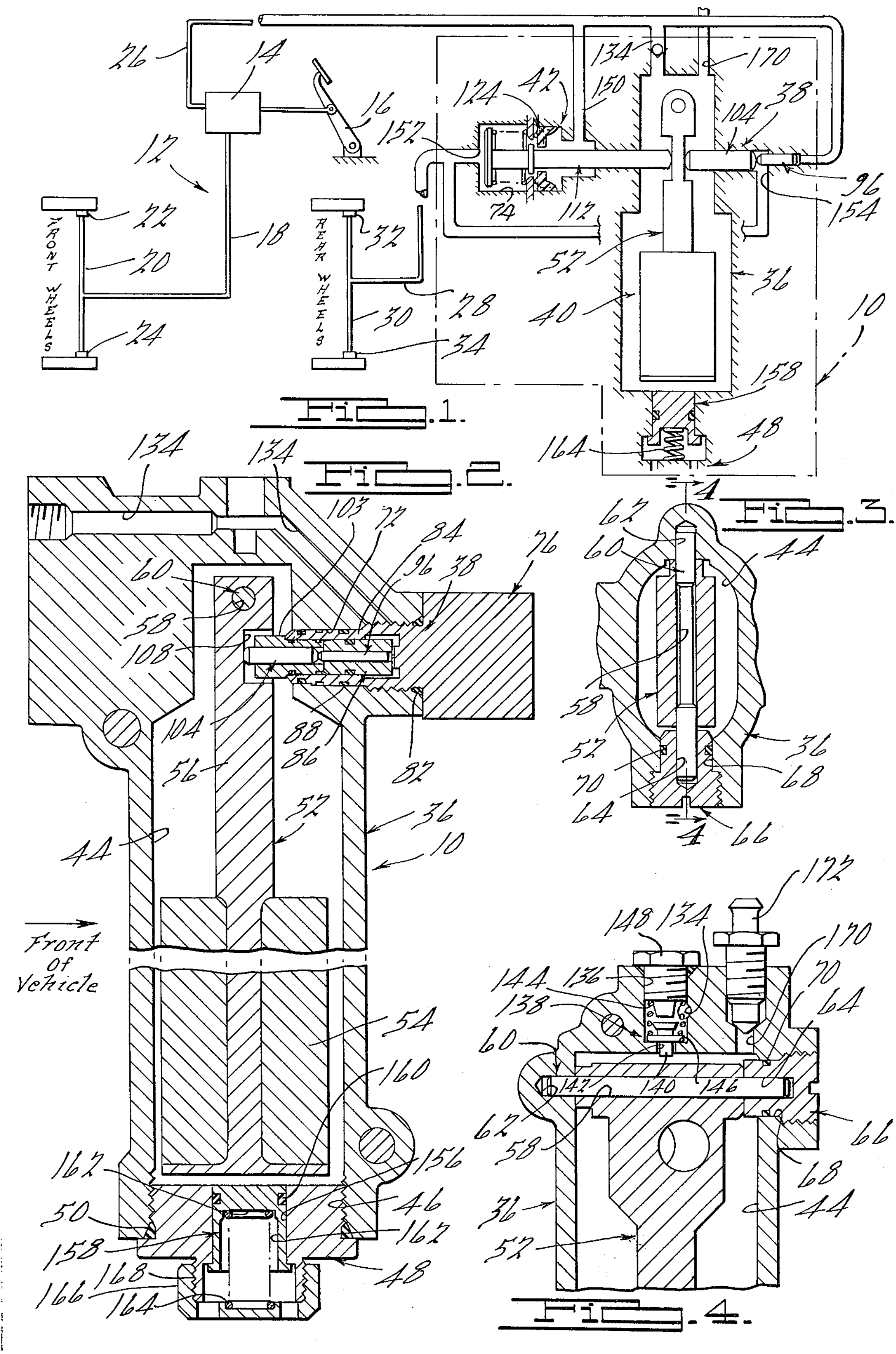
FIG. 1 is a schematic representation of the load sensitive proportioning valve of the present invention as shown in operative association with a typical vehicular brake system.
FIG. 2 is an enlarged transverse cross-sectional view of the proportioning valve of the present invention.
FIG. 3 is an enlarged fragmentary cross-sectional view of a portion of the proportioning valve shown in FIG. 2.
FIG. 4 is a transverse cross-sectional view taken substantially along the line 4—4 of FIG. 3.

Referring now in detail to the drawings and in particular to the schematic drawing shown in FIG. 1, a load sensitive proportioning valve assembly 10, in accordance with one preferred embodiment of the present invention, is shown in operative association with a typical vehicular braking system 12 including a master cylinder 14 which is actuable in a conventional manner by a foot operated brake pedal 16. The master cylinder 14 is operatively connected via fluid conduits 18 and 20 with the front wheel brake cylinders 22 and 24 of the brake system 12. Additionally, the master cylinder is connected via conduit 26, the valve assembly 10 and conduits 28 and 30 with the rear wheel brake cylinders 32 and 34 of the brake system 12. The valve assembly 10 includes a valve housing, generally designated by the numeral 36, which operatively houses a piston assembly 38, a deceleration responsive assembly 40 and a proportioning valve assembly 42, all of which assemblies 38–42 are operable to modulate or porportion hydraulic fluid from the master cylinder 14 to the rear wheel cylinders 32, 34, and at the same time accommodate for variations in vehicle loading which might otherwise have the effect of causing the valve assembly 10 to deviate in its proportioning operation from the idealized pressure transmitted from the master cylinder 14 to the brake cylinders 22, 24 and 32, 34.

The valve housing 36, as best seen in FIG. 2, is shown with an enlarged chamber 44 having a lower internally threaded annular opening 46 which is closed by a suitable closure plug 48. Means in the form of a suitable O-ring or the like 50 is provided interjacent the periphery of the opening 46 and the closure plug 48 for effecting a fluid-tight seal therebetween. Disposed within the chamber 44 is the deceleration responsive assembly 40 which consists of a movable pendulum 52 or predetermined mass and pendulum length. The pendulum 52 includes a weighted lower end or mass 54 which is fixedly secured to the lower end of an elongated support arm 56, the upper end of which is formed with a transversely extending bore 58, as best seen in FIGS. 3 and 4. Disposed within and extending through the bore 58 is an elongated pivot pin 60, one end of which is nestingly received within a blind bore 62 formed within the wall of the housing 36. The opposite end of the pivot pin 60 is received within a bore 64 located in a plug 66 that is threadably received within an opening or aperture 68 formed coaxially of the bore 62 on the opposite side of the housing 36. A suitable O-ring sealing element or the like 70 is provided circumjacent the plug 66, as illustrated. As will hereinafter be described in detail, the pendulum 52 is adapted to pivot about an axis extending through the pin 60 in response to deceleration of the associated vehicle, whereby to exert a force of predetermined magnitude upon the proportioning valve assembly 42.

The housing 36 is formed with a pair of generally parallel bores 72 and 74 which are oriented generally perpendicularly to the chamber 44 and, as best seen in FIG. 5, are located on the opposite sides thereof. The bore 72 is adapted to operatively house the piston assembly 38, while the bore 74 has the proportioning valve assembly 42 disposed therewithin. The outer end of the bore 72 has a closure plug 76 threadably received therewithin, which plug 76 is formed with an externally threaded inner end 78 adapted to be threadably received within an enlarged diameter counterbore 80 formed within the bore 72. Means in the form of an O-ring sealing member 82 is interposed between the outer periphery of the closure plug 76 and the inner periphery of the bore 72 for providing a fluid-tight seal therebetween.

Referring now to the details of the piston assembly 38, as best seen in FIGS. 2 and 5, the closure plug 76 is formed with a pair of integral coaxial sleeve sections 84 and 98 which are disposed at axially spaced positions within the bore 72. The sleeve section 84 has an annular O-ring sealing member 88 or the like extending around the outer periphery thereof and providing a fluid-tight seal between the outer periphery thereof and the inner periphery of the bore 72. Disposed within an annular axially extending bore 89 of the sleeve section 84 is a sleeve member 86, a suitable sealing element 90 being provided between the outer periphery of the sleeve member 86 and the bore 89. The sleeve member 86 is formed with a central axially extending bore 92 within which an axially slidable piston 96 is disposed. A suitable O-ring sealing element or the like 100 is disposed between the outer periphery of the sleeve section 98 and the inner periphery of the inner end of the bore 72. The sleeve section 98 is formed with a central axially extending bore 101 within which a sleeve 103 is disposed. The sleeve 103 is formed with a coaxial bore 102 within which a second longitudinally slidable piston 104 is disposed. An O-ring sealing element 105 provides a fluid-tight seal between the outer periphery of the sleeve 103 and the bore 101. The piston 104 includes a forward end portion 106 which is adapted to abuttingly engage an end face or surface 108 defined within a recess 110 adjacent the upper end of the support arm 56 of the pendulum 52, as best seen in FIG. 5. The opposite (outer) end of the piston 104 is abuttingly engaged with the inner end of the piston 96 and, as will hereinafter be described in detail, the pistons 96 and 104 are adapted to have fluid pressure act thereon to produce a force which cooperates with the pendulum 52 in controlling operation of the proportioning valve assembly 42.

Referring now in detail to the construction and operation of the proportioning valve assembly 42, as best seen in FIG. 5, said assembly includes a proportioning piston member 112 which is preferably of a construction similar to that disclosed in U.S. Pat. No. 3,423,936, assigned to the assignee of this application and incorporated by reference in the descriptive portion of this specification. The piston member 112 includes a generally cylindrically-shaped body 114 which is formed with enlarged diameter, axially spaced shoulder or flange portion 118 around an intermediate portion thereof. The flange portion 118 defines a sealing surface 122 that is adapted for sealing engagement with a resilient deformable valve member 124 which is best shown in FIG. 5. The valve member 124 and flange portion 118 are operative together to control the flow of fluid between the conduit 26 and the conduit 28 and hence between the master cylinder 14 and the rear wheel brake cylinders 32, 34. While the valve member 124 is preferably of a construction shown and described in the aforementioned U.S. Pat. No. 3,423,936, by way of brief explanation, the member 124 includes a lip 126 which is normally inclined radially outwardly to engage the side wall of the valve bore 74 and acts to prevent flow thereby from the conduit 28 into the conduit 26. An annular snap ring or the like 125 is disposed within the bore 74 directly outwardly from the valve member 124 and is adapted to be engaged by a plurality of bosses 128 on the valve member 124 in a manner so as to provide communication of fluid between the inner and outer ends of the bore 74. The outer periphery of the valve member 124 is formed with a plurality of circumferentially-spaced axially extending grooves 130 adapted to provide a flow path for fluid around the outer periphery of the valve member 124, and accordingly, when the fluid pressure within the valve bore 74 on the left (outer) side of the valve member 124 (as seen in Fig. 5) is greater than that on the opposite or right side of the valve member 124, the pressure difference can deflect the lip 126 inwardly to permit the reverse flow of fluid from the brake cylinders 32, 34 into the valve bore 74. As best seen in FIG. 5, the bore 74 includes a threaded outer end portion 127 and a reduced diameter inner end portion 129 within which a sleeve or guide member 131 is disposed. A suitable O-ring sealing member 133 is disposed between the outer periphery of the member 131 and the bore portion 129 to provide a fluid-tight seal therebetween. The member 131 is formed with an internal bore 135 that is coaxial of the bore 74 and within which an elongated end portion 137 of the piston 112 is reciprocally disposed. The extreme inner end of the piston portion 137 is disposed closely adjacent (but not engaged with) a surface 139 defined by a recess 141 formed on the opposite side of the pendulum 52 from the recess 110, whereby pivotal movement of the pendulum 52 will effect reciprocal movement of the proportioning piston 112 in a manner hereinafter to be described.

With reference again to FIG. 2, the housing 36 is formed with a generally transversely extending bore or passage 134 which is communicable at its outer (left) end with the conduit 26 (via a suitable fitting or the like, not shown), and is communicable with the bore 72 adjacent the outer end of the piston 96. As seen in FIG. 4, the bore or passage 134 is also communicable with a generally vertical or upright bore 136 formed in the housing 36, the bore 136 functioning to house a check valve assembly, generally designated by the numeral 138. The assembly 138 includes a vertically movable valve element 140 which is adapted to function in selectively opening the closing a flow path through a passage 142 which communicates the upper end of the chamber 44 with the bore 136. The valve element 140 is resiliently biased downwardly by a valve spring 144, whereby the valve element 140 is urged into sealing engagement with a sealing surface 146. The upper end of the spring 144 bears against a closure plug 148 which is threadably received within the upper end of the bore 136. The inner end of the plug 76 is preferably slotted or otherwise grooved, as seen at 149 to provide fluid access between the passage 134 and the outer end of the piston 96, as seen in FIG. 2.

The inner end portion 129 of the valve bore 74 is connected within the hydraulic circuitry of the valve assembly 10 by means of a fluid passage 150 which is representatively designated in FIG. 1 and functions to communicate the valve bore 74 with the aforedescribed fluid passage 134. The outer end portion 127 of the valve bore 74 is communicable with a fluid passage 152 which is in turn communicable with both the conduit 28 and with a second fluid passage 154, the latter of which is communicable with the bore 72 and also with the bore 102 via an annular groove 155 and cross bores 157 formed in the plug 76 at a position interjacent the sleeve sections 84, 98. As best seen in FIG. 5, the cross bores 157 communicate via bores 159 in the sleeve 103 with the piston 104.

As best seen in FIG. 2, the closure plug 48 closing the lower end of the chamber 44 is formed with a central bore 156 within which a piston 158 is reciprocally mounted. Means in the form of a suitable O-ring sealing element or the like 160 is provided between the outer periphery of the piston 158 and the periphery of the bore 156. The underside of the piston 158 is provided with a blind bore 162 within which the upper end of a coil spring 164 is located. The lower end of the spring 164 bears upon a closure cap 166 which is threadably mounted upon a downwardly projecting annular portion 168 formed on the plug 48, as illustrated. The bore 156 and piston 158 provided therein function as a fluid accumulator and to force fluid which has leaked past the end portion 137 of the piston 112 and the piston 104 back through the check valve assembly 138 to the master cylinder 14. The hydraulic circuitry of the valve assembly 10 of the present invention is completed through the provision of a bleed passage 170 which, as best seen in FIG. 4, is communicable with the upper end of the chamber 44 and is provided at its outer end with a suitable closure fitting 172.

The proportioning piston 112 is normally located in the position shown in FIG. 5 wherein the shoulder 118 is spaced from the valve member 124, whereby the flow of fluid from the master cylinder is unimpeded along a route (see FIG. 1) defined by the conduit 26, passage 150, valve bore 74, passage 152 and conduit 28 with the rear wheel brake cylinders 32, 34. The piston 112 is held in this position by means of a helical coil spring 174 that is disposed coaxially around the body portion 114 of the piston 112. The inner end of the spring 174 bears against the snap ring 125, while the outer end of the spring 174 bears against an enlarged diameter shoulder 115 formed on the outer end of piston 112. As shown in FIG. 5, the ring 125 is held in place within the bore 74 by means of a counter-bored closure plug 178 that is threaded within the outer end of the bore 74 and is provided with a suitable O-ring sealing element 180. The plug 178 is formed with suitable slots 179 on the inner end thereof to communicate the passage 152 with the valve assembly 42. At such time as a certain relative pressure level is obtained within the valve bore 74, the piston member 112 will move to the right in FIG. 5, whereupon the surface 122 of the flange portion 118 will engage the valve member 124 so as to block fluid flow from the passage 150 to the passage 152 and hence from the master cylinder 14 to the rear wheel brake cylinders 32, 34. As is described in the aforementioned U.S. Pat. No. 3,423,936, the proportioning piston 112 will not move toward the right in FIG. 5 until such time as the force of the spring 174 is overcome. This force is generally referred to as $F_S$. The magnitude of the inlet pressure, hereinafter identified as $P_1$, from the master cylinder 14 at which closure of the proportioning valve assembly 42 occurs is preselected for the desired braking effect. Thus, closure will occur when $P_1A$ is greater than $F_S$, where A is the cross-sectional area of the valve body 137 upon which the fluid pressure from the passage 150 acts upon the piston 112. After the flange 118 closes against the valve member 124, as the inlet pressure from the master cylinder 14 is increased, the pressure within the right or inner end of the valve bore 74 will increase, and the piston 112 will be urged toward its open position, as shown in FIG. 5. The pressure in the valve bore 74 will act on the proportioning piston 112 over an effective area of B – A, where B is the area defined by the main sealing diameter of the flange 118 against the valve member 124. The resulting force on the proportioning piston 112 cooperates with the spring force $F_S$ to bias the piston 112 toward its open position. After the valve assembly 42 is thus opened, some of the increased fluid pressure transmitted to the valve bore 74 through the passage 150 from the master cylinder 14 creates an opposing force to again close the valve 42; however, since the fluid pressure in the outer or left end of the bore 74 (as seen in FIG. 5) adjacent the passage 152 acts on a larger area B than the fluid pressure in the valve bore 74 communicable with the passage 150, only a portion of the total increase in fluid pressure is required to close the valve 42. This is the proportioning effect and it will respond to the following relationship:

$$\Delta P_1 (B - A)/B = \Delta P_2, \qquad 1$$

where $\Delta P_1$ is the increase in pressure at the passage 150 from the master cylinder 14; $\Delta P_2$ is the increase in pressure at the passage 152 communicable with the brake cylinders 32, 34; and $$P_2 B = P_1 (B - A) + F_S, \qquad 2$$

where $P_2$ is the pressure in the outlet passage 152 and $P_1$ is the pressure from the master cylinder 14. Equation (1) defines the proportional relationship between the inlet and outlet pressures during proportioning operation of the valve 42, while Equation (2) defines absolute values of the inlet and outlet pressures during the proportioning operation.

In accordance with the principles of the present invention, the valve assembly 10 is designed and constructed such that the magnitude of the pressure at which the proportioning valve 42 begins to operate will vary in order to compensate for different vehicle loading conditions. The desirability of this can be seen from the graphic representation in U.S. patent application Ser. No. 124,214, filed Mar. 15, 1971, which is incorporated by reference herein.

to the description of the overall operation of the valve assembly 10 of the present invention, a brief description will be given as to the logic underlying the design and operation thereof. During a typical braking operation, the braking force on a vehicle is represented by the following relationship:

$$F_B = (C_F P_F + C_R P_R - [C_{OR} + C_{OF}]) \frac{2}{r} \quad 3$$

In Equation (3), $F_B$ is equal to the braking force (lbs.); $C_F$, $C_R$ are the wheel torque constants for the front and rear wheels (ft. lbs./psi); $P_F$, $P_R$ is equal to the front and rear brake fluid pressures (psi); $C_{OR}$ and $C_{OF}$ are equal to the ordinant offset for the rear and front brakes, respectively, (ft. lb.), and $r$ is equal to the rolling radius of the vehicle tires. The relationship between the braking force and vehicle deceleration is represented in Equation (4) which is:

$$F_B = \frac{W \cdot A}{g} \quad 4$$

where $W$ is equal to the weight of the vehicle (lbs.); $A$ is equal to the rate of vehicle deceleration (ft./sec.$^2$), and $g$ is equal to the acceleration of gravity (ft./sec.$^2$). Equating Equations (3) and (4) and solving for $W$ results in the following relationship:

$$W = \frac{2g}{rA}(C_F P_F + C_R P_R - [C_{OR} + C_{OF}]) \quad 5$$

A examination of Equation (5) indicates that when two signals proportional to front and rear brake pressures are added and then divided by a signal proportional to acceleration there results a signal proportional to vehicle weight; however, since it is impractical to practically and commercially construct a device which will divide two signals, such as is required by Equation (5), the relationship of this equation can be linearized by well known methods. Such as linearization procedure is described in a textbook entitled *Automatic Control Engineering* by Francis Raven and published by McGraw-Hill and results in Equation (6):

$$W \approx K_1 P_F + K_2 P_R - K_3 A - K_4 \quad 6$$

which essentially consists of the relationship as set forth in Equation (5) over a predetermined operating range and indicates that a signal approximately proportional to $W$ can be obtained by adding signals $P_F$ and $P_R$, substracting signal $A$ and biasing the proportioning piston 112 according to $K_4$. Such addition and substraction of signals can be accomplished once the signals are converted into actual forces, and the valve assembly 10 of the present invention is designed to accomplish this end. More particularly, it will be noted that the pistons 96 and 104 are sensitive or responsive to the pressures $P_F$ and $P_R$ in Equation (6) and act on the pendulum 52 and through the pendulum support arm 56 upon the end portion 137 of the proportioning piston 112. In addition, since the pendulum 52 is sensitive to vehicle deceleration, the force representative of signal A in Equation (6) is substracted from the additive or cumulative forces provided by the pistons 96, 104, providing the signals $P_F$ and $P_R$. The reason for this is that the entire valve assembly 10 is intended to be mounted within the associated vehicle such that the front of the vehicle is located in the direction of the arrow in FIG. 2. This, of course, results in the weighted lower end 54 of the pendulum 52 pivoting in a counterclockwise direction in FIG. 2 about the pin 60 during a braking operation. Thus, the proportioning piston 112 has three forces acting thereagainst over and above the force of the spring 174, namely, the pistons 96 and 104 are acting in conjunction with the spring 174 while the pendulum 52 acts in opposition to the spring 174, which results in the split point of the proportioning valve 42 changing in accordance with changes in vehicular loading.

Referring now in detail to the overall operation of the valve assembly 10, the components of the device 10 normally occupy their respective positions shown in FIGS. 2 and 5 when the brake pedal 16 is released. At such time as it is desired to effect a braking operation, the brakes are applied by depressing the pedal 16 to operate the master cylinder 14 which results in fluid flow through the conduits 18, 20 to the front wheel brake cylinders 22, 24. Concomitantly, fluid is communicated through the conduit 26 and thereafter through the passage 150 into the proportioning valve bore 74. Additionally, fluid is communicated through the passage 134 to the outer (right) end of the bore 72 where the fluid pressure will act on the outer end of the piston 96. The fluid which is communicated into the proportioning valve bore 74 will be proportioned or modulated by the proportioning valve assembly 42, whereupon such fluid will be communicated via the passage 152 to the conduits 28, 30 to the rear wheel brake cylinders 32, 34, with a portion of this fluid being communicated via the passage 154 back into the piston bore 72 where it will act upon the piston 104 therein.

By virtue of the increase in fluid pressures acting upon the pistons 96 and 104, said pistons will exert a leftwardly directed force in FIG. 5 against the pendulum support member 56. The cumulative force of the pistons 96, 104 is transmitted through the support 56 to the proportioning piston 112 in conjunction to the force of the spring 174. In addition, a force acting in the opposite direction to the spring 174, i.e., toward the right in FIG. 5, will be exerted due to the swinging or pivotal movement of the pendulum 52, which force, as will be apparent, is in opposition to the forces produced by the pistons 96, 104. By properly designing the cross-sectional sizes of the pistons 96, 104 and by properly designing the mass and size of the pendulum 52, signals relating to the pressures $P_F$ and $P_R$ in Equation (6), and a third signal representative of the vehicle deceleration (signal A in Equation (6)) will be exerted against the proportioning piston 112 such that the modulating operation thereof will change in accordance with the rate of deceleration and hence degree of loading of the associated vehicle, as depicted in the graphic representation shown in the aforementioned copending patent application Ser. No. 124,214.

It will be noted that it is not necessary that the deceleration be sensed by a swinging pendulum in the present invention in that a sliding or reciprocable pendulum (as opposed to a pivotable element) could readily be utilized in producing the signal A in Equation (6). Moreover, it will be appreciated that it is not necessary that the cumulative signals relating to $P_F$ and $P_R$ in Equation (6) be produced by the pistons 96 and 104 acting in end-to-end serial relation. For example, the pistons 96, 104 could be arranged in side-by-side relation and still provide the desired additive forces relating to the signals $P_F$ and $P_R$ to control the operation of the proportioning piston 112. As previously mentioned, it is desirable to provide a predetermined spacing between the end 137 of the proportioning piston 112 and the abutting surface 139 of the pendulum 52, whereby the pendulum will swing the predetermined distance before it engages the piston 112, thus compensating for the normal time lag between the time the brake pedal 16 is depressed and the brake cylinders of the associated brake system are actuated. Such a time lag could, of course, be accomplished by means of a hydraulic accumulator or the like, although proper spacing between the piston 112 and pendulum 52 accomplishes the desired goal in a much more simple manner. It will be noted that the valve assembly 10 of the present invention is intended to find universality of application in that the sizes of pistons 96, 104 and their respective mounting sleeves may be readily interchanged with pistons of different sizes, whereby to adapt the valve assembly for vehicles of different load carrying capacities or different brake systems.

While it will be apparent that the preferred embodiment illustrated herein is well calculated to fulfill the objects above stated, it will be appreciated that the present invention is susceptible to modification, variation and change without departing from the scope of the invention.

I claim:

1. In an automotive vehicle having a source of hydraulic fluid and front and rear wheel hydraulically actuated brake systems, the improvement comprising:

proportioning valve means in one of the systems actuable for modulating the brake pressure in that one system to provide for a reduced brake effect at the rear wheels relative to that at the front wheels to compensate for weight transfer during braking, said proportioning valve means comprising a modulating piston means movable between positions opening and closing a flow path from said fluid source to said one brake system, and bias means providing a force to move said piston means toward one of said positions, said bias means including a first means responsive to the magnitude of deceleration of the vehicle and second means responsive to fluid pressure from said fluid source and the modulated fluid pressure from said proportioning valve means, whereby the modulating effect of said proportioning valve means compensates for variations in loading of the vehicle.

2. The invention as set forth in claim 1 wherein said first means comprises a member movable in response to deceleration of the associated vehicle to apply a predetermined force on said piston.

3. The invention as set forth in claim 2 wherein said deceleration responsive means comprises a swinging pendulum means adapted to apply a force against said piston means.

4. The invention as set forth in claim 1 wherein said second means comprises first and second fluid operable pistons means.

5. The invention as set forth in claim 1 wherein said first means comprises a weighted element, and wherein said second means comprises first and second fluid responsive pistons.

6. The invention as set forth in claim 5 wherein said weighted element is movably disposed within a chamber and is operable to apply a force in one direction to said piston means.

7. The invention as set forth in claim 6 wherein said first and second pistons are operable to apply a cumulative force to said piston means.

8. The invention as set forth in claim 6 wherein one of said pistons is responsive to the fluid pressure from said fluid source.

9. The invention as set forth in claim 8 wherein the other of said pistons is responsive to the modulated fluid pressure from said proportioning valve, means.

10. The invention as set forth in claim 9 wherein said first and second pistons are located on the opposite side of said weighted element from said modulating piston means.

11. The invention set forth in claim 5 which includes time lag means cooperative with said weighted element and said second responsive means.

12. The invention set forth in claim 5 wherein said weighted element and said second responsive means are positioned a predetermined distance from said piston means.

13. In an automotive vehicle having a source of pressurized fluid and front and rear wheel fluid actuated brake systems, proportioning valve means in one of the systems actuable for modulating the brake pressure in that one system to provide for a reduced brake effect at the rear wheels relative to that at the front wheels to compensate for weight transfer during braking, said proportioning valve means comprising a proportioning piston means and an associated valve member operatively connected in said one system to modulate the brake pressure therein upon attainment of a determinable magnitude of brake pressure, first bias means for biasing said piston means toward a position providing an open flow path from said source to said one system, and second bias means for applying force to said piston means to change the operating characteristics thereof in accordance with variations in loading of the vehicle, said second biasing means includes first responsive means responsive to the magnitude of deceleration of the vehicle and second responsive means responsive to fluid pressure from said fluid source and the modulated fluid pressure from said proportioning valve means.

14. The invention as set forth in claim 13 wherein said first responsive means comprises a member movable in response to deceleration of the associated vehicle to apply a predetermined force on said piston.

15. The invention as set forth in claim 14 wherein said deceleration responsive means comprises a swinging pendulum means adapted to apply a force against said piston means.

16. The invention as set forth in claim 13 wherein said second responsive means comprises first and second fluid operable pistons.

17. The invention as set forth in claim 13 wherein said first responsive means comprises a weighted element, and wherein said second responsive means comprises first and second fluid responsive pistons.

18. The invention as set forth in claim 17 wherein said weighted element is movably disposed within a chanber and is operable to apply a force in one direction to said piston means.

19. The invention as set forth in claim 18 wherein said first and second fluid responsive pistons are operable to apply a cumulative force in the opposite direction to said proportioning piston means.

20. The invention as set forth in claim 18 wherein said first fluid responsive piston is responsive to the fluid pressure from said fluid source.

21. The invention as set forth in claim 20 wherein said second fluid responsive piston is responsive to the modulated fluid pressure from said proportioning valve means.

22. The invention as set forth in claim 21 wherein said first and second pistons are located on the opposite side of said weighted element from said proportioning piston means.

23. The invention as set forth in claim 17 which includes time lag means cooperative with said weighted element and said second responsive means.

24. In an automotive vehicle having a source of hydraulic fluid and front and rear wheel hydraulically actuated brake systems, the improvement comprising:

proportioning valve means in one of the systems actuable for modulating the brake pressure in that one system to provide for a reduced brake effect at the rear wheels relative to that at the front wheels to compensate for weight transfer during braking, said proportioning valve means comprising a modulating piston element movable between positions opening and closing a flow path from said fluid source to said one brake system, and bias means providing a force to move said piston element toward one of said positions, said bias means including a first means comprising a weighted element movably mounted within a chamber, responsive to the magnitude of deceleration of the vehicle, and operable and positioned to apply a first force directly against said piston element, and a second means comprising piston means responsive to the fluid pressure in said one system and operable to apply a second force against said piston element, whereby the modulating effect of said proportioning valve means compensates for variations in loading of the vehicle.

25. The invention as set forth in claim 24 wherein said piston element is responsive to two separate fluid pressure conditions.

26. The invention as set forth in claim 25 wherein one of said pressure conditions is the fluid pressure in said one system.

27. The invention as set forth in claim 25 wherein one of said pressure conditions is the modulated fluid pressure of said proportioning valve means.

28. The invention as set forth in claim 24 wherein said first means comprises a swinging pendulum means adapted to apply a force against said piston element.

29. The invention as set forth in claim 24 wherein said piston means comprises first and second fluid operable pistons.

30. The invention as set forth in claim 24 wherein said first means comprises a swingable pendulum, and wherein said second means comprises first and second fluid responsive pistons.

31. The invention as set forth in claim 30 wherein said first and second pistons are operable to apply a cumulative force against said piston element.

32. The invention as set forth in claim 30 wherein one of said pistons is responsive to the fluid pressure in said one system.

33. The invention as set forth in claim 32 wherein the other of said pistons is responsive to the modulated fluid pressure from said proportioning valve means.

34. The invention as set forth in claim 33 wherein said first and second pistons are located on the opposite side of said pendulum from said proportioning piston element.

35. The invention set forth in claim 24 which includes time lag means cooperative with said weighted element and said second means.

36. The invention set forth in claim 24 wherein said weighted element is positioned a predetermined distance from said piston element.

37. In an automotive vehicle having a source of pressurized fluid and front and rear wheel fluid actuated brake systems, proportioning valve means in one of the systems actuable for modulating the brake pressure in that one system to provide for a reduced brake effect at the rear wheels relative to that at the front wheels to compensate for weight transfer during braking, said proportioning valve means comprising a proportioning piston element and an associated valve member operatively connected in said one system to modulate the brake pressure therein upon attainment of a determinable magnitude of brake pressure, first bias means for biasing said piston element toward a position providing an open flow path from said source to said one system, and second bias means for applying a force to said piston element to change the operating characteristics thereof in accordance with variations in loading of the vehicle, said second biasing means including a weighted element movably mounted within a chamber, responsive to the magnitude of deceleration of the vehicle, and operable and positioned to apply a first force directly against said piston element, said second bias means further including fluid piston means responsive to a predetermined fluid pressure and operable to apply a second force against said piston element.

38. The invention as set forth in claim 37 wherein said fluid piston means is responsive to two separate fluid pressure conditions.

39. The invention as set forth in claim 38 wherein one of said pressure conditions is the fluid pressure in said one system.

40. The invention as set forth in claim 38 wherein one of said pressure conditions is the modulated fluid pressure of said proportioning valve means.

41. The invention as set forth in claim 38 wherein said fluid piston means comprises first and second fluid operable pistons.

42. The invention as set forth in claim 41 wherein said first and second pistons are operable to apply a cumulative force against said piston element.

43. The invention as set forth in claim 41 wherein one of said pistons is responsive to the fluid pressure in said one system.

44. The invention as set forth in claim 43 wherein the other of said pistons is responsive to the modulated fluid pressure from said proportioning valve means.

45. The invention as set forth in claim 44 wherein said first and second pistons are located on the opposite side of said weighted element from said proportioning piston element.

46. The invention as set forth in claim 37 wherein said weighted element comprises a swingable pendulum.

47. The invention as set forth in claim 37 which includes time lag means cooperative with said weighted element and said second means.

48. In an automotive vehicle having a source of hydraulic fluid and front and rear wheel hydraulically actuated brake systems, the improvement comprising:

proportioning valve means in one of the systems actuable for modulating the brake pressure in that one system to provide for a reduced brake effect at the rear wheels relative to that at the front wheels to compensate for weight transfer during braking, said proportioning valve means comprising a proportioning piston means movable between positions opening and closing a flow path from said fluid source to said one brake system, and bias means providing a force to move said proportioning piston means toward one of said positions, said bias means including first means responsive to the magnitude of deceleration of the vehicle and operable to apply a first force directly against said proportioning piston means, and a second means comprising responsive piston means responsive to fluid pressure from said fluid source and the modulated fluid pressure from said proportioning valve means and operable to apply a second force against said proportioning piston means, whereby the modulating effect of said proportioning valve means compensates for variations in loading of the vehicle.

49. The invention set forth in claim 48 which includes time lag means cooperative with said first and second bias means.

50. The invention set forth in claim 48 wherein said first means responsive to the magnitude of deceleration of the vehicle is positioned a predetermined distance from said proportioning piston means.

51. In an automotive vehicle having a source of hydraulic fluid and front and rear wheel hydraulically actuated brake systems, the improvement comprising:

proportioning valve means in one of the systems actuable for modulating the brake pressure in that one system to provide for a reduced brake effect at the rear wheels relative to that at the front wheels to compensate for weight transfer during braking, said proportioning valve means comprising a proportioning piston means movable between positions opening and closing a flow path from said fluid source to said one brake system, and bias means providing a force to move said proportioning piston means toward one of said positions, said bias means including first means comprising a weighted element movably mounted within a chamber, responsive to the magnitude of deceleration of the vehicle, and operable and positioned to apply a first force directly against said proportioning piston means, and second means comprising responsive piston means responsive to fluid pressure from said fluid source and the modulated fluid pressure from said proportioning valve means and operable to apply a second force against said proportioning piston means, whereby the modulating effect of said proportioning valve means compensates for variations in loading of the vehicle.

52. The invention set forth in claim 51 wherein said weighted element is positioned a predetermined distance from said proportioning piston means.

53. In an automotive vehicle having a source of hydraulic fluid and front and rear wheel hydraulically actuated brake systems, the improvement comprising:

proportioning valve means in one of the systems actuable for modulating the brake pressure in that one system to provide for a reduced brake effect at the rear wheels relative to that at the front wheels to compensate for weight transfer during braking, said proportioning valve means comprising a proportioning piston means movable between positions opening and closing a flow path from said fluid source to said one brake system, and bias means providing a force to move said proportioning piston means toward one of said positions, said bias means including first responsive bias means responsive to the magnitude of deceleration of the vehicle and operable to apply a first force against said proportioning piston means, and second responsive bias means comprising first responsive piston means responsive to the fluid pressure from said fluid source and second responsive piston means responsive to the modulated fluid pressure from said proportioning valve means, said second responsive bias means operable to apply a second force against said proportioning piston means, whereby the modulating effect of said proportioning valve means compensates for variations in loading of the vehicle.

54. The invention set forth in claim 53 which includes time lag means cooperative with said first and second responsive bias means.

* * * * *

UNITED STATES PATENT OFFICE

CERTIFICATE OF CORRECTION

PATENT NO. : 3,954,307

DATED : May 4, 1976

INVENTOR(S) : Michael R. Young

It is certified that error appears in the above-identified patent and that said Letters Patent are hereby corrected as shown below:

Col. 2, line 66: after "52", "or" should be --of--.

Col. 5, line 5: "the" should be --and--.

Col. 7, line 4: Insert --Prior-- before "to the description".

Col. 7, line 37: "A" should be --An--.

Col. 7, line 46: "Such as" should be --Such a--.

Signed and Sealed this

Seventeenth Day of August 1976

[SEAL]

*Attest:*

RUTH C. MASON
*Attesting Officer*

C. MARSHALL DANN
*Commissioner of Patents and Trademarks*